United States Patent [19]

Sumrall

[11] Patent Number: 5,000,471
[45] Date of Patent: Mar. 19, 1991

[54] BOAT HITCH

[75] Inventor: Curtis E. Sumrall, Anniston, Ala.

[73] Assignee: H. E. Mahaffey, Bessemer, Ala.

[21] Appl. No.: 408,259

[22] Filed: Sep. 18, 1989

[51] Int. Cl.$^5$ .............................................. B60P 3/10
[52] U.S. Cl. .................................. 280/414.1; 280/477; 114/344
[58] Field of Search ............... 280/414.1, 414.2, 414.3, 280/477, 482; 114/248, 249, 259, 375, 344; 414/537, 536, 531, 532, 529; 403/84, 111, 113, 330

[56] References Cited

U.S. PATENT DOCUMENTS

| | | | |
|---|---|---|---|
| 3,557,741 | 1/1971 | Teasdale | 114/249 |
| 3,750,805 | 8/1973 | Finney | 280/414.1 |
| 3,963,263 | 6/1976 | Whitlock | 280/414.1 |
| 4,114,920 | 9/1978 | Boettcher | 414/529 |
| 4,463,965 | 8/1984 | Lawson | 414/536 |
| 4,623,161 | 11/1986 | Sprague | 280/414.1 |
| 4,641,598 | 2/1987 | Hodges | 114/344 |
| 4,641,851 | 2/1987 | Knies | 114/344 |

Primary Examiner—David M. Mitchell
Assistant Examiner—A. M. Boehler
Attorney, Agent, or Firm—Fleit, Jacobson, Cohn, Price, Holman & Stern

[57] ABSTRACT

A boat hitch for latching or hitching the bow of a boat to a boat trailer to provide efficient and safe withdrawal of a boat from the water and hitching the boat to the trailer to enhance the safety factor in towing a boat and trailer over the highway. The boat hitch includes a pivotal latch structure mounted on the forward end portion of a boat trailer which is associated with a cam-type keeper on the bow of the boat in which the keeper includes a curved cam ramp extending from a shallow forward end to a rearward end having greater depth and a keeper surface generally extending vertically at the rearward end of the cam ramp. The latch includes a pivotal pawl that is locked in a vertical position in engagement with the keeper surface when the boat is locked on the trailer with the pawl being manually released and pivoted to a generally rearwardly extending horizontal position for releasing the boat to enable it to move off the trailer when launching the boat into a body of water.

8 Claims, 2 Drawing Sheets

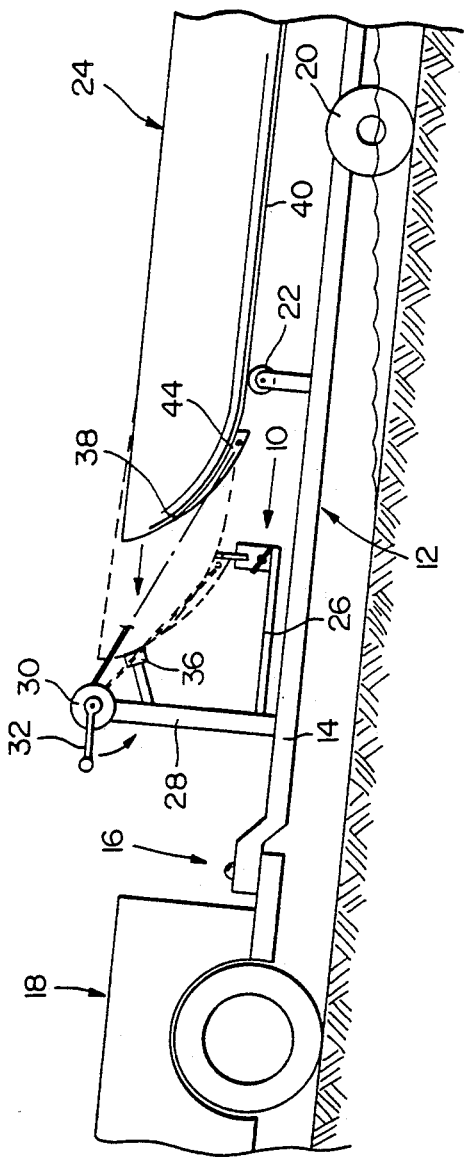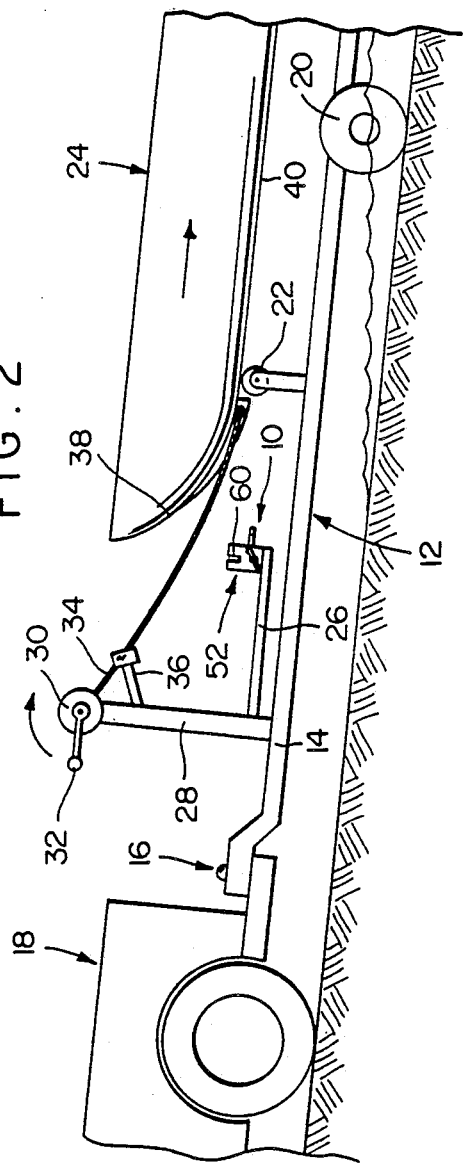

BOAT HITCH

BACKGROUND OF THE INVENTION

FIELD OF THE INVENTION

The present invention generally relates to a boat hitch and more specifically a structure for latching or hitching the bow of a boat to a boat trailer to provide efficient and safe withdrawal of a boat from the water and hitching the boat to the trailer to enhance the safety factor in towing a boat and trailer over the highway. The boat hitch includes a pivotal latch mounted on the forward end portion of a boat trailer which is associated with a cam-type keeper on the bow of the boat in which the keeper includes a curved cam ramp extending from a shallow forward end to a rearward end having greater depth and a keeper surface generally extending vertically at the rearward end of the cam ramp. The latch includes a pivotal pawl that is locked in a vertical position in engagement with the keeper surface when the boat is locked on the trailer with the pawl being manually released and pivoted to a generally rearwardly extending horizontal position for releasing the boat to enable it to move off the trailer when launching the boat into a body of water.

INFORMATION DISCLOSURE STATEMENT

When loading a boat onto a boat trailer from a body of water, the trailer is usually backed into the water a distance to enable the boat to be driven onto the trailer by the boat motor. While both the trailer and boat are in the water, the operator of the boat has to climb from the bow of the boat to the trailer tongue and attach the winch rope to the bow eye and turn the winch crank to wind the rope and pull the boat onto the trailer until the bow of the boat is snug against the bow rest at the forward end of the trailer. This is a hazardous operation since the surfaces are frequently wet and a person performing this operation is in danger of falling from the bow of the boat or from the tongue of the trailer and such a fall could cause a severe injury. Even if another person other than the operator of the boat wades into the water to winch the boat onto the trailer, the feet and legs of that person become wet and uncomfortable. The following U.S. Pat. Nos. disclose developments in the field of loading boats onto boat trailers.

3,750,805
3,963,263
4,114,920
4,463,965
4,623,161
4,641,598
4,641,851

None of the above patents discloses the specific structure of this invention which will automatically lock the boat onto the trailer when the boat is driven onto the trailer by operation of the boat motor without anyone climbing out of the boat or wading into the water to secure the boat to the trailer.

SUMMARY OF THE INVENTION

An object of the present invention is to provide a boat hitch for securely anchoring a boat on a boat trailer when the boat is being withdrawn from a body of water with the hitch being rendered effective by the operator of the boat driving the boat onto the boat trailer thereby eliminating the boat operator or another person manually winching the boat onto the boat trailer and consequently eliminating hazardous conditions which exist when climbing out of the boat and eliminating personnel having to wade into the body of water to operate the winch.

Another object of the invention is to provide a boat hitch in accordance with the preceding object in which the boat includes a cam-type keeper mounted at the bow end portion of the boat with the cam-type keeper including a cam ramp which extends longitudinally from a forward low point to a high point at the rear with the high point at the rear of the ramp forming a rearwardly facing keeper surface generally perpendicular to the forward end portion of the keel of the boat where it curves upwardly into the bow section.

A further object of the invention is to provide a boat hitch in accordance with the preceding objects in which the trailer is provided with a pawl or latch plate which is releasably locked in a vertical position for positioning behind and in engagement with the vertical keeper surface at the rear of the cam ramp with the pawl or latch plate being locked in vertical position which enables the operator of the boat to drive the boat forwardly to cause the cam ramp to move into engagement with the upper edge of the pawl with additional forward movement causing the cam ramp to move along the upper edge of the pawl until the vertical rearward edge of the cam ramp passes the pawl at which time the vertical keeper surface on the cam ramp will drop downwardly and engage the front surface of the pawl or latch plate thereby locking the boat to the boat trailer.

Still another object of the invention is to provide a boat hitch in accordance with the preceding objects in which the pawl or latch plate is engaged with a slot in a mounting bracket secured stationarily to the boat trailer with the pawl or latch plate being laterally spring biased into engagement with the vertical slot and being laterally movable by exerting manual pressure thereon to release the pawl or latch plate from the slot to enable it to pivot rearwardly to a generally horizontal position thereby releasing the pawl or latch plate from the vertical keeper surface and enabling the boat to be driven off the trailer into a body of water in a conventional manner.

A still further object of the invention is to provide a boat hitch in accordance with the preceding objects which is safe in operation, relatively simple in construction, durable and long-lasting and effectively and safely locking a boat to a boat trailer without requiring any action of personnel other than the operator of a boat driving the boat onto the trailer.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view illustrating the forward movement of the boat onto a boat trailer and illustrating the position of the boat hitch.

FIG. 2 is an elevational view similar to FIG. 1 but illustrating the boat hitch released to enable movement of the boat from the boat trailer.

DESCRIPTION OF THE PREFERRED EMBODIMENT

Figure 3:
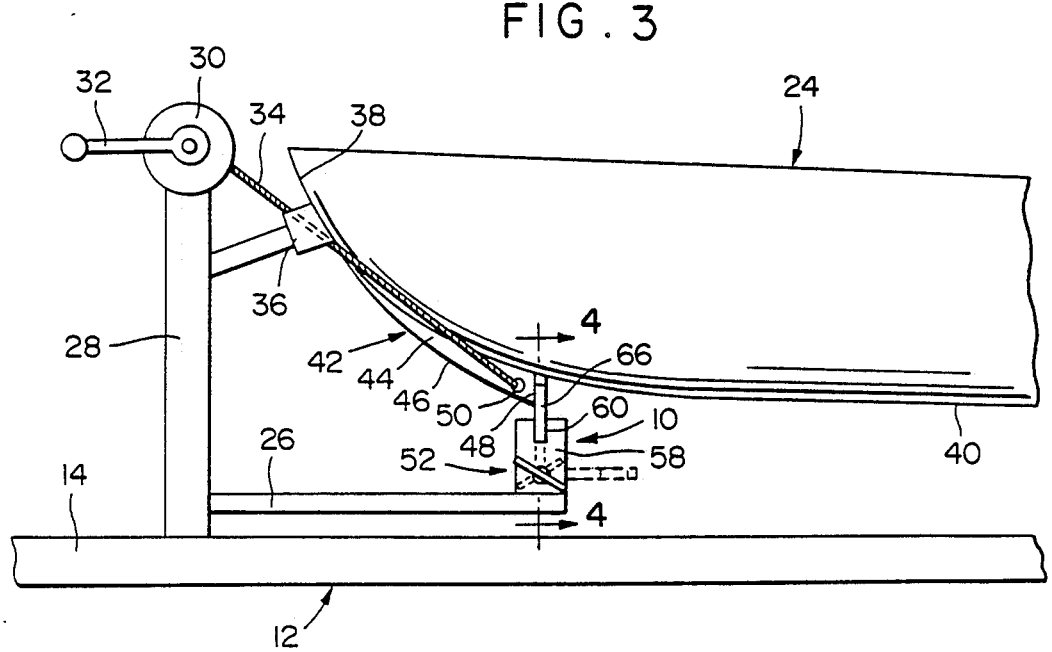
FIG. 3 is a detailed side elevational view illustrating the boat hitch in locked position in relation to the boat.

Referring now specifically to the drawings, the boat hitch of the present invention is generally designated by the reference numeral 10 and is mounted fixedly from the forward end portion of a boat trailer 12 which includes the usual supporting frame and tongue 14 with a hitch 16 at the forward end for connection with a towing vehicle 18 in a conventional manner. The trailer 12 includes the usual supporting wheels 20 and rollers 22 on which a boat 24 is supported when on the trailer. The specific construction of the trailer, the towing vehicle and the association of the trailer with the boat is conventional with the boat hitch 10 of the present invention including a supporting member 26 in the form of an elongated arm that is rigidly attached to an upstanding winch stand 28 normally provided at the forward end of the boat trailer. The winch stand 28 is also conventional and normally provided with a winch drum 30 with a handle 32 attached thereto and a rope or cable 34 wound thereon and provided with a hook or other means on the free end thereof for connection with a normally provided bow eye on the boat 24. The winch stand 28 also includes a bow rest 36 engaging the bow 38 of the boat 24. The winch stand and associated structure is conventional with the arm 26 being rigidly affixed thereto in any suitable manner as by welding, bolting or the like. The arm 26 could also be attached to other components of the trailer as long as the boat hitch 10 is rigidly supported for association with the upwardly curved bow 38 of the boat where it curves rearwardly into the keel area 40 of the boat.

The bow 38 of the boat includes a cam-type keeper generally designated by reference numeral 42 which includes an elongated centrally disposed rib or flange 44 rigidly affixed to the curved bow section 38 from a point below the upper end of the bow section to a point generally at the forward end of the horizontal keel portion 40 as illustrated in FIG. 3. The forward edge of the flange 44 forms a cam ramp 46 which progressively diverges from the bow section of the boat 24 toward the rear as illustrated in FIG. 3. The rearward end of the flange 44 terminates in a vertical edge 48 forming a keeper surface that extends downwardly from the bottom surface of the boat hull with the surface 48 being generally vertical when the boat is positioned for support on the trailer 12. The flange 44 also includes an opening 50 forming the bow eye to which the winch rope or cable 34 can be connected by either a hook or by a U-shaped clevis and pin.

The boat hitch 10 includes a U-shaped bracket generally designated by reference numeral 52 which includes a generally horizontal bight portion or web 54 extending transversely across the upper surface of the arm 26 and being rigidly affixed thereto by welding, bolting or the like. The bracket 52 also includes upstanding, generally vertical legs 56 and 58 with the leg 58 including a vertical slot 60 extending downwardly from the upper edge thereof for a distance approximately one-half the length of the leg 58. Also, each of the legs 56 and 58 includes an aperture 62 which are in alignment with each other and are disposed adjacent to but spaced slightly above the web 54.

Figure 4:
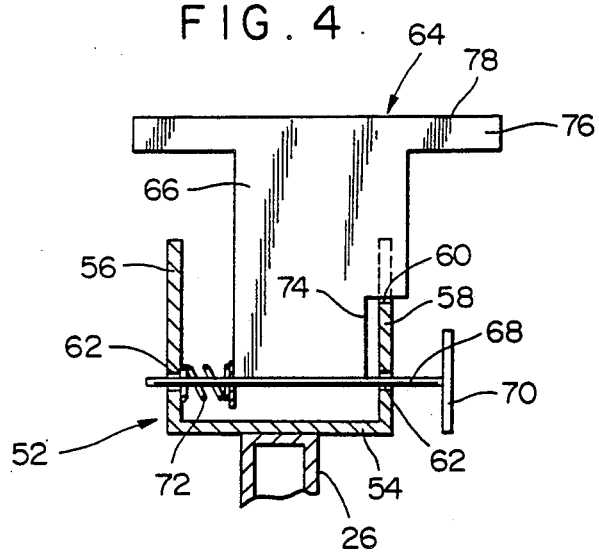
FIG. 4 is a transverse, sectional view taken along section line 4—4 on FIG. 3 illustrating the structure of the boat hitch.
Figure 5:
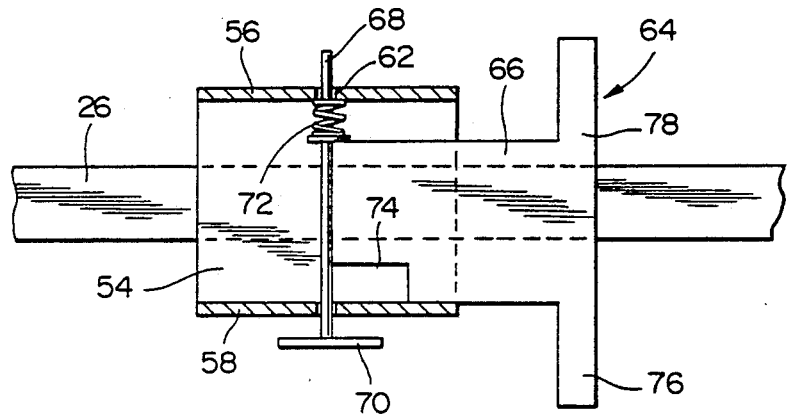
FIG. 5 is a plan view of the boat hitch in released position.

Pivotally supported from the bracket 52 is a latch plate or pawl 64 which includes a generally flat rectangular plate 66 having a pivot rod 68 rigidly affixed to the inner end thereof with the rod projecting from both side edges of the plate 66 and being pivotally received in the apertures 62 thereby pivotally connecting the pawl 64 to the bracket 52. One end of the rod 68 is provided with a tee handle 70 rigidly affixed thereto by which the rod 68 and thus the plate 66 can be pivoted about an axis defined by the rod 68. As illustrated in FIG. 4, the width of the plate 66 is less than the distance between the inner surface of the legs 56 and 58 which enables the plate 66 to move laterally between the surfaces of the legs 56 and 58. A compression coil spring 72 is interposed between one edge of the plate 66 and the inner surface of the leg 56 to bias the plate 66 towards the leg 58. The edge of the plate 66 which faces the plate 58 includes a notch 74 of rectangular configuration in the inner end portion thereof with the length of the notch 74 being substantially equal to the distance between the aperture 62 in the plate 58 and the inner end of the slot 60. The width of the slot 60 is sufficient to receive the edge of the plate 66 as illustrated in FIG. 4 with this association of components locking the plate 66 against pivotal movement. However, inward pressure on the handle 70 will compress the spring 72 and move the notched edge of the plate 66 out of registry with the slot 60 and slightly inwardly of the inner surface of the plate 58 thus enabling the plate or pawl 66 to pivot downwardly from a vertical locked position as illustrated in FIGS. 3 and 4 to a generally horizontal released position as illustrated in FIGS. 2 and 5. The outer edge of the plate 66 includes a pair of laterally extending edge wings 76 which effectively increases the width of the plate 66 at its outer edge. One of the legs 56 or 58 can be removably connected to the web 54 to enable assembly of the components or the bracket may be welded into its final configuration after assembly of the pawl or latch 64 therewith. The distance between the handle 70 and the edge of the plate 66 and the length and compression characteristics of the spring 72 enable the plate 66 to move from the position illustrated in FIG. 4 in which the notched edge of the plate is received in the slot 60 to a position illustrated in FIG. 5 with the plate 66 received completely between the inner surfaces of the legs 56 and 58 which enables the plate 66 to pivot in relation to the bracket 52.

Assuming that the boat 24 is loaded onto the trailer for over-the-road movement as illustrated in FIG. 3 and it is then desired to launch the boat into a body of water, the trailer with the boat thereon is backed to the edge of a body of water in a well-known manner. The handle 70 is then pushed inwardly along with the pawl 64 until the notched edge of the plate 66 is moved out of the slot 60 and slightly inwardly of the inner surface of the leg 58. The handle 70 is then turned to pivot the pawl or latch plate 64 toward the rear of the trailer and boat to a generally horizontal position as illustrated in FIG. 2 thus releasing the pawl or latch plate 64 from the keeper surface 48 on the cam-type latch or keeper 42. The winch rope or cable may be used to control rearward movement of the boat in relation to the trailer as illustrated in FIG. 2 or the winch rope or cable can be initially detached from the bow eye 50 so that the boat can be driven off the trailer by the boat operator after the boat hitch 10 has been released. The pawl or latch plate 64 will be retained in its horizontal released position by the weight of the pawl or latch plate 64 in addition to the frictional engagement of the notched edge of the plate 66 with the inner surface of the leg 58 thereby preventing the pawl or latch plate 64 from returning to its locked position while the boat is being launched from the trailer and until the handle 70 is manually engaged to pivot the pawl or latch plate 64 back to its vertical locked position. Once the boat has been launched, the handle 70 is pivoted to swing the pawl or latch plate 64 back to its vertical position until the edge of the plate 66 having the notch 74 therein is aligned with the slot 60 at which time the handle 70 is released and the spring 72 will cause the lateral movement of the plate 66 to position the notched edge of the plate 66 in the slot 60 thereby holding the pawl or latch plate 64 in a rigid vertical position.

When reloading the boat onto the trailer by withdrawing it from the body of water, the pawl or cam plate 64 is in the locked vertical position as illustrated in FIG. 3 and, with the trailer backed into the water, the boat is driven onto the trailer until the cam-type keeper 42 at the bow section 38 of the boat 24 comes into contact with the wide upper edge 78 of the pawl or cam plate 64 and as the boat 24 proceeds forwardly, the cam ramp 46 rides along the edge 78 until the vertical keeper surface 48 passes the forward edge of the plate 66 with the cam-type keeper 42 then dropping down to the position illustrated in FIG. 3 so that the vertical forward surface of the plate 66 is in contact with the vertical keeper surface 48 thus securely locking the boat in position on the trailer. The locking engagement of the pawl and cam plate 64 will produce a snap sound as the top edge 78 of the plate 66 comes into contact with the vertically dropping boat hull thus providing an audible signal to the operator of the boat and assuring the operator that the boat is securely hitched to the trailer and is ready to be towed up the boat ramp without the hazard of the boat sliding backwards off the trailer. After the boat trailer with the boat securely latched thereon by the boat hitch 10 reaches the top of the ramp or an adjacent area, the winch rope or cable 34 is attached to the bow eye 50 and tightened for towing the boat over the road to enhance the safety factor since the boat hitch will retain the boat in position on the trailer in the event the winch rope 34 becomes ineffective. Thus, the boat hitch provides a simple, economical, maintenance free and safely operated hitch.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A boat hitch for releasably retaining a boat on a boat trailer comprising bracket means adapted to be mounted fixedly on a boat trailer in generally underlying relation to a bow section of a boat when supported on the boat trailer, retractable pawl means mounted on said bracket means and including a latch plate having opposite end edges, one upper end edge of said plate projecting above the bracket means and adapted to engage the boat positioned on the boat trailer with the latch plate being movable to a position out of engagement with the boat positioned on the boat trailer when the boat is to be launched from the boat trailer into a body of water, and keeper means adapted to be mounted on the boat adjacent the bow section, said keeper means including a generally vertically disposed keeper surface extending downwardly from the boat for engaging a forward surface of the latch plate when the latch plate is in a vertical locking position with the keeper means moving along the upper edge of the latch plate when the boat is moved onto the trailer to a position with the keeper surface disposed forwardly of the latch plate to enable the keeper means to move downwardly to engage the keeper surface with the forward surface of the latch plate, said keeper means being in the form of a cam ramp adapted to be mounted on and extending longitudinally of the boat with a forward edge of the cam ramp being closer to the boat hull than a rearward edge, said cam ramp including a cam surface which progressively diverges from the forward end to the rearward end of the cam ramp, the rearward end of the cam ramp defining said vertical keeper surface, said cam surface engaging the upper edge of the latch plate and riding along the upper edge of the latch plate as the boat is driven into the boat trailer that has been backed into a body of water for withdrawing the boat from the water, said bracket means including a pair of substantially vertical legs, each of said legs terminating in an upper edge, said latch plate extending between the vertical legs and means pivotally and laterally movably supporting the latch plate between the legs, one of said legs including a vertical slot communicating with the upper edge thereof, said latch plate including a notched edge defining a projection for reception in the slot when the latch plate is in one lateral position thereby locking the latch plate in vertical position with lateral movement of the latch plate away from the slotted leg releasing the latch plate from the slotted leg and enabling the latch plate to be pivoted to a substantially horizontal position to disengage the latch plate from the vertical keeper surface.

2. The structure as defined as defined in claim 1 wherein said means supporting the latch plate between the legs includes an elongated rod attached to the other end edge of said latch plate and extending through apertures in the legs, a handle on one end of the rod outwardly of one of the associated legs, spring means on the rod interposed between the other of the legs and a side edge of the latch plate to bias the latch plate toward the slotted leg to automatically lock the latch plate in vertical position when the latch plate is pivoted into alignment with the vertical slot in the slotted leg.

3. The structure as defined in claim 2 wherein said cam ramp includes an eye adjacent the vertical keeper surface to enable a winch rope mounted on the trailer to be connected thereto.

4. The structure as defined in claim 3 together with a winch stand and winch and bow rest to be mounted on the trailer for engaging the bow of the boat when positioned on the trailer.

5. The combination of a boat trailer and boat mounted thereon for over-the-road movement and capable of being launched from the trailer when the trailer is backed into a body of water and withdrawn from the body of water onto the trailer with the boat trailer including a forward mounted winch used to control the movement of the boat off the trailer when launching and pulling the boat onto the trailer when loading the boat onto the trailer, a latch assembly for releasably latching the boat to the trailer when the boat is driven onto the trailer when it is being withdrawn from a body of water with the latching operation being automatic and audibly indicated to the boat operator thereby enabling the boat to be positioned on the boat trailer without the boat operator climbing down off the boat and without a person wading into the water to operate a winch structure for pulling the boat onto the trailer, said latch assembly including a cam on the bow of the boat terminating in a substantially vertical rearwardly facing keeper surface depending from the bottom surface of the boat and generally along the center line thereof and a pawl mounted on the boat trailer for automatically engaging the keeper surface when the boat is driven onto the boat trailer by an operator thereby automatically latching the boat to the trailer for subsequent withdrawal of the boat from the body of water by the use of a towing vehicle pulling the trailer with the boat latched thereto up a boat ramp after which a winch cable can be attached to a bow eye on the boat for overthe-road movement, said latch assembly also including a mounting bracket for said pawl and including means enabling the pawl to move between an inoperative retracted position and an extended boat locking position and locking the pawl rigidly in extended boat locking position for engagement with the vertical keeper surface when the vertical keeper surface moves to a position forwardly of the pawl and drops downwardly to provide an audible signal to the boat operator that the latching function has been completed.

6. The combination as defined in claim 5 wherein said means enabling movement of the pawl including means interconnecting the mounting bracket and pawl to enable pivotal movement of the pawl about a transverse axis in relation to the center line of the boat when the boat is positioned on the trailer, said pawl including a plate having an upwardly facing edge and a forwardly facing surface for engagement with the keeper surface when the boat is driven onto the boat trailer, said upwardly facing edge extending transversely of the boat when on the trailer and being substantially longer in length than the width of the cam on the bow of the boat to facilitate engagement of the pawl with the cam even when the bow of the boat and the cam are not precisely aligned with the center of the pawl and boat trailer.

7. The combination as defined in claim 6 wherein said means locking the pawl rigidly in extended position includes means mechanically interconnecting the pawl and mounting bracket when the pawl is in extended position thereby assuring that the bow of the boat and cam must move up over the upwardly facing edge of the pawl when the pawl is in extended position thereby producing a secure locking engagement with the keeper surface and producing an audible signal to the boat operator and an operator of a towing vehicle.

8. The combination of a boat trailer and boat mounted thereon for over-the-road movement and capable of being launched from the trailer when the trailer is backed into a body of water and withdrawn from the body of water onto the trailer when the trailer is backed into the body of water, said boat including a keeper mounted on the bow and along the center line thereof, said keeper including a cam having a cam surface progressively diverging from the surface of the boat hull from a forward end of the cam to a rearward end thereof, the rearward end of the cam including a keeper surface generally vertically disposed and perpendicular to the center line of the boat with the keeper surface facing rearwardly, said boat trailer including a latch assembly engaging the keeper surface when the boat is driven onto the trailer when the boat is being withdrawn from a body of water, said latch assembly including a pawl which is selectively rigidly retained in an extended boat locking position having a laterally elongated upper edge and a forwardly facing surface, said upper edge and forwardly facing surface on the pawl being substantially longer than the width of the vertical keeper surface to enable locking engagement of the pawl with the keeper surface by forward movement of the boat and cam over the upper edge of the pawl without requiring accurate alignment of the cam and keeper surface with a center portion of the pawl when the boat is being driven onto the boat trailer with the cam surface riding over the upper edge of the pawl while rigidly retained in its extended boat locking position and the keeper surface dropping downwardly to engage the forwardly facing surface of the pawl to provide a positive latching connection and an audible signal capable of being heard by a boat operator and a tow vehicle operator connected to the boat trailer to indicate that the boat trailer and boat can be withdrawn from the water.

* * * * *